US007013840B2

(12) United States Patent
Leon (10) Patent No.: US 7,013,840 B2
(45) Date of Patent: Mar. 21, 2006

(54) DOG LEASH FOR USE ON BICYCLE

(76) Inventor: Michael A. Leon, 1135 Edgewood Ranch Rd., Orlando, FL (US) 32835

( * ) Notice: Subject to any disclaimer, the term of this patent is extended or adjusted under 35 U.S.C. 154(b) by 0 days.

(21) Appl. No.: 10/902,553

(22) Filed: Jul. 29, 2004

(65) Prior Publication Data

US 2005/0022752 A1 Feb. 3, 2005

Related U.S. Application Data

(60) Provisional application No. 60/490,999, filed on Jul. 30, 2003.

(51) Int. Cl.
*B60R 22/00* (2006.01)
(52) U.S. Cl. .................................................. 119/771
(58) Field of Classification Search ................ 119/769, 119/771, 772, 780, 784, 703, 704; 280/292, 280/204, 288.4
See application file for complete search history.

(56) References Cited

U.S. PATENT DOCUMENTS

| 4,134,364 A | * | 1/1979 | Boncela ....................... 119/703 |
| 4,854,269 A | * | 8/1989 | Arntzen ....................... 119/703 |
| 5,033,409 A | * | 7/1991 | Sabot ........................... D19/77 |
| 5,215,037 A | * | 6/1993 | Allred .......................... 119/771 |
| 5,375,561 A | * | 12/1994 | Gundersen ................... 119/771 |
| 5,632,233 A | * | 5/1997 | Kovach ....................... 119/771 |
| 5,842,445 A | * | 12/1998 | Barbour ....................... 119/771 |
| 6,135,059 A | * | 10/2000 | Brock .......................... 119/702 |
| 6,148,772 A | * | 11/2000 | Keyek-Frannsen .......... 119/771 |
| 2005/0005876 A1 | * | 1/2005 | Calvi ........................... 119/771 |
| 2005/0034685 A1 | * | 2/2005 | Chen ........................... 119/771 |

* cited by examiner

*Primary Examiner*—T. Nguyen
(74) *Attorney, Agent, or Firm*—Vivian L. Steadman; Harry I. Leon (57) ABSTRACT

A compound leash for use with a bicycle as a person simultaneously rides the bicycle and runs the animal. Made by a dog lover and bicyclist, the leash allows the dog to range across an area extending from about 10 inches to about 3 feet laterally from one side of the bicycle and about 2 feet forward and and aft of its rear axle. The leash comprises a mast, a clamp and a flexible connector joining them together. Mounted on the bicycle frame below its rear axle, the connector terminates outwardly in the mast which extends upwardly therefrom. Secured to the mast distal from the connector is at least one strap attachable to the dog's collar or harness. With the connector so mounted below the rear axle, the force from a harsh sidewise pull on the mast by the animal tends to tip the bicycle away from him rather than tipping the bicycle on the animal.

7 Claims, 6 Drawing Sheets

DOG LEASH FOR USE ON BICYCLE

CROSS REFERENCE TO RELATED APPLICATION

The subject matter of this application was disclosed in U.S. Provisional Patent Application having Ser. No. 60/490,999 and a filing date of Jul. 30, 2003.

BACKGROUND OF THE INVENTION

Taking a dog along for a run when one is riding a bicycle can be a delightful experience,.for both the dog and the bicyclist. To enhance this experience, the prior art offers a variety of dog leashes; but problems with these devices—related to the comfort and safety of both the rider and the dog—abound. Keeping the dog at a safe :distance from the bicycle is one such problem. Another is keeping a large animal under control and the bicycle stable if the pet exhibits erratic behavior or lunges away from the bicycle. Moreover, with these earlier devices, the dog cannot run in view beside the bicycle rider and then trail behind, as needed, to maneuver past obstacles, such as those which arise when the path narrows. Rather the dog is kept behind the rider, out of his peripheral view, at all times. Further, most of these devices do not have any force limiting feature to protect the animal and rider. An exception is a leash sold by Springer which includes a breakaway plastic link. Not only must this link be replaced each time it is used but also its use releases the animal instead of holding him safely in check.

In addition to lending themselves to problems stemming from the dog's running position and occasional erratic behavior, the prior art devices are time-consuming to install. Some of them require wheel removal and glue. Others are mounted high on the bicycle frame interfering with the rider's ability to pedal and making the bicycle less stable. Still others utilize mounting structures which are not compatible with all bicycle frames.

SUMMARY OF THE INVENTION

The primary object of this invention is to provide a leash easily attachable to a bicycle which its rider can use to keep a dog and the bicycle, in combination, under control at all times, while allowing the animal to enjoy a wide range of movement so that he can run in view beside the rider and then even trail behind the bicycle as needed to avoid obstacles.

A further object of this invention is to provide a dog leash which, in use, is attached to the bicycle in such a way that harsh side pulls by the animal are applied to points on the bicycle unlikely to destabilize and tip it.

A still further object of this invention is to provide a dog leash which can be quickly attached to the frame of any bicycle without removing of any wheel and which, during installation, can be readily adjusted, according to the size of the dog to be tethered, so as to allow the dog to run comfortably and at the same time reduce the forces he can exert through a harsh sideways pull, thereby giving both the dog and the bicycle rider a safe and enjoyable adventure.

The improved dog leash comprises a clamp and a mast connected thereto. The clamp can be quickly and easily attached, without the use of tools or glue, to any bicycle on a portion thereof common to all bicycle frames. As the leash is being installed, it can be readily adjusted to accommodate the particular dog being tethered according to his size. The rider can also select not only whether to employ separable mast sections but also whether to engage devices attached thereto for holding contiguous mast sections—otherwise joined together by a slip fit—in assembled relation and the amount of force required to separate these mast sections and cause a secondary leash extension to be released.

The clamp is attached to the bicycle's rear wheel support frame in such a manner as to reduce the tipping forces from the animal by applying these forces below the bicycle's rear axle. In the preferred embodiment, the tipping forces are applied about 3 inches below the axle. Tipping forces from the animal are further reduced by positioning the end of the mast distal from the clamp at the dog's shoulder height as the mast is being installed so that the animal must lower its head, reducing its pulling ability, for side pulls.

A very flexible coupling between the clamp and the mast allows the mast to have up to 180 degrees of motion in the forward and aft directions and over 90 degrees of motion in the direction perpendicular to the bicycle. This flexibility greatly reduces the chance of injury to the animal even in the event of a sudden stoppage such as would occur if the animal were to go around the opposite side of a tree or pole from the bicyclist. With such a leash, an animal can run comfortably without experiencing a strong feedback even after a harsh pull by the bicycle.

The apparatus is designed to keep the animal under control at all times at a safe running distance from the bicycle. For example, this distance is roughly from 10 inches to about 3 feet.

The mast preferably comprises lightweight hollow sections which, in assembled relation, are of sufficient length to keep the animal at a safe running distance from the bicycle. In combination with the flexible coupling and a pair of straps attached to the end of the mast distal therefrom, the mast maintains a comfortable controlled running space for the dog. This running space encompasses an area which preferably extends at least 2 feet in the forward and aft directions from the rear wheel axle and which is disposed from roughly 10 inches to about 3 feet to one side of the bicycle.

In the The preferred embodiment, the leash further has comprises a secondary cord fabricated of a very elastic rubber whose distal ends are affixed to the inside walls of two of the mast sections. When the leash is pulled sharply and the mast sections separate, the rubber secondary cord still restrains the animal. This secondary cord provides the animal approximately 3 feet of additional shock absorption or stopping distance. Alternately, this cord can be made from an inelastic material.

The mast, preferably comprising three hollow sections, can be adjusted so as to reconfigure its overall height. The mast, together with the clamp, provides sufficient flexibility for one to adapt the leash for use with nearly any size dog. The optimum adjustment is for the top of the mast to be disposed, in use, at about the shoulder height of the animal.

Connected to the top of the mast is a pair of flexible straps, attachable to a standard dog collar or harness. This pair of straps enhances the animal's range of motion. These straps can also be detached from the mast and used separately as a walking leash. Alternately, one can use the leash according to present invention, while the leash is still attached to the bicycle, to walk with the animal.

DETAILED DESCRIPTION OF THE PREFERRED EMBODIMENT

Figure 1:
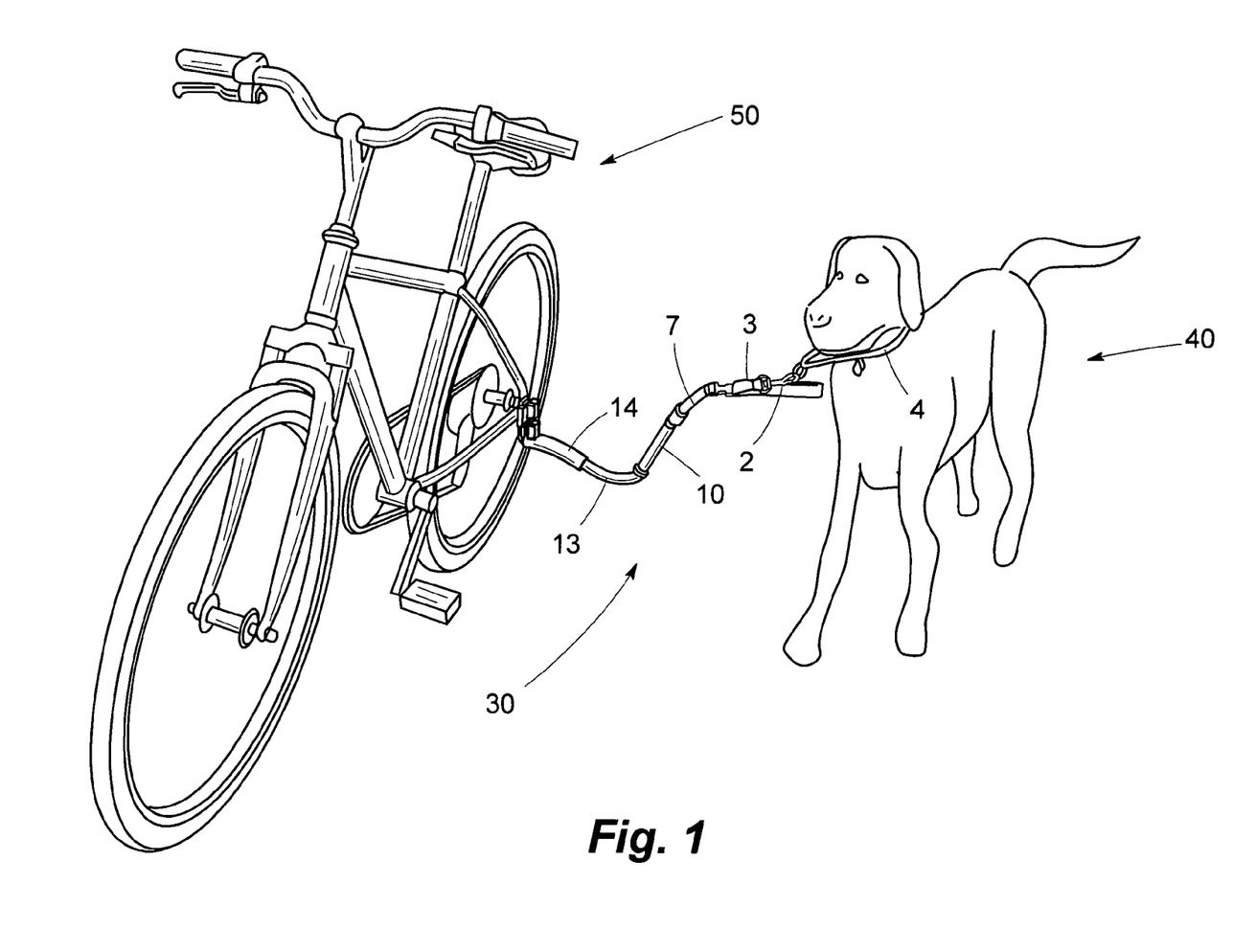
FIG. 1 is a perspective view of the improved dog leash according the present invention, the leash being shown with its distal ends mounted on a typical bicycle and attached to a dog's collar, respectively.

In the drawings and referring more particularly to FIG. 1, a leash according to the present invention, which is indicated generally by the reference number 30, is mounted on a typical bicycle 50. A close-up of the leash 30, prior to its installation, is shown in FIG. 2.

Figure 3:
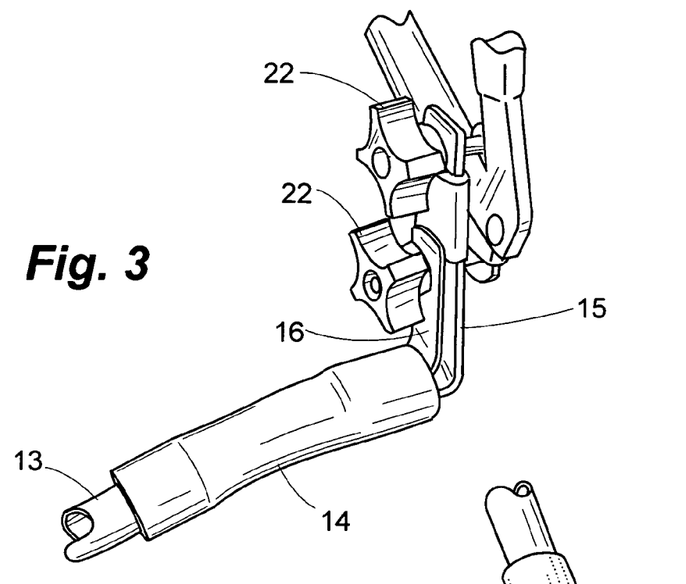
FIG. 3 is a perspective view, on a further enlarged scale, of fragmentary portions of the leash according to FIG. 1 and of the bicycle frame supporting a rear axle to which a mounting structure situated at one end of the leash is clamped during use.
Figure 4:
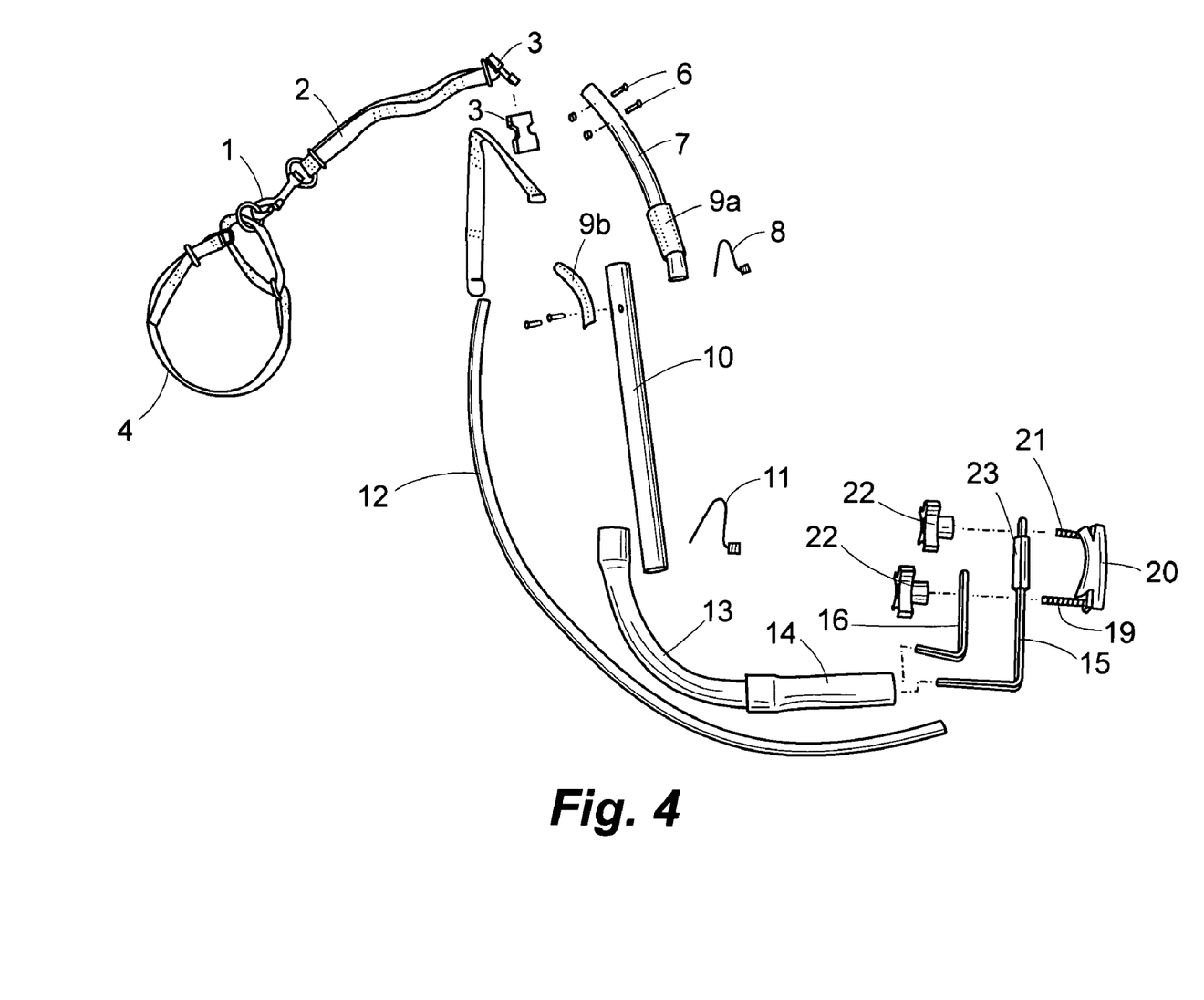
FIG. 4 is an exploded view of the dog leash according to FIG. 1.

As illustrated on FIG. 3, the leash 30 is installed on the frame supporting the rear axle of the bicycle 50. Included in the leash 30 is a mounting structure having outer and inner clamp members 15 and 20 (FIGS. 3 and 4). The mounting structure is clamped on the frame near the rear axle without removing the rear wheel of the bicycle. The inner clamp member 20 is placed inside the frame with mounting bolts 19, 21 pointing outwardly from the bicycle 50. Means for retaining the outer and inner clamp members 15 and 20 in assembled relation includes not only the mounting bolts 19 and 21 but also nuts 22 which are preferably threaded hand knobs. In the preferred embodiment, the shanks of bolts 19, 20 are held, during installation, in a fixed position relative to the inner clamp member 20 so that the nuts 22 can be easily turned without turning the bolts. For example, the bolts 19 and 21 can be carriage bolts which engage suitably sized square holes defined by the inner clamp member 20. Pads 23 keep the clamp members 15, 20, which are preferably fabricated from either aluminum or steel, from damaging the paint on the bicycle 50.

Figure 2:
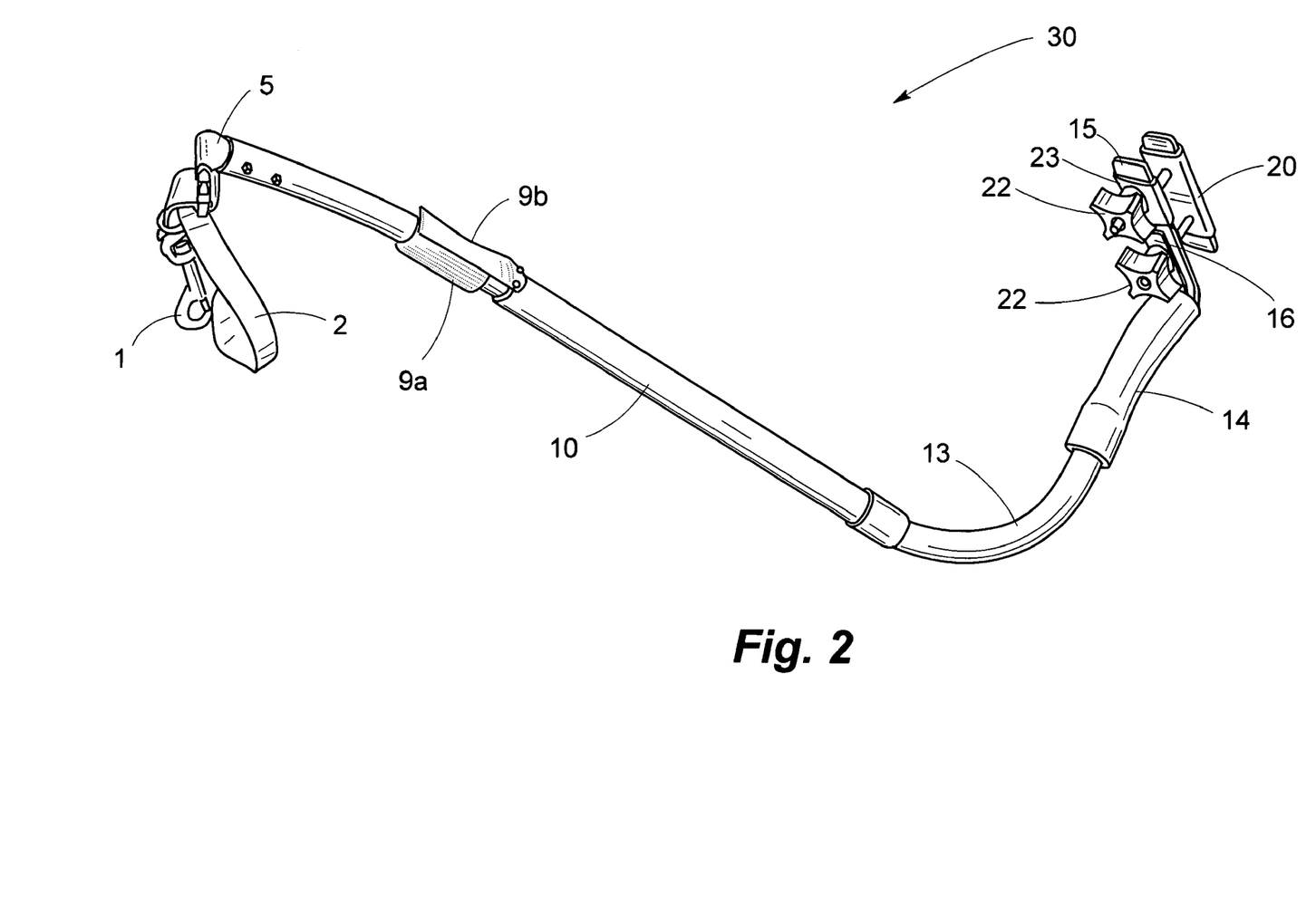
FIG. 2 is a perspective view, on an enlarged scale, of the dog leash according to FIG. 1.

In addition to the mounting structure, the leash 30 comprises a lightweight, hollow mast, a formed angle member 16, and a reinforced hose segment 14 (FIGS. 2-4). The angle member 16, like the clamp members 15, 20, is preferably made from either aluminum or steel. The hose segment 14 flexibly connects the mast to the mounting structure and to the formed angle member 16. In the installed leash 30, ears on the outer clamp member 15 and on the angle member 16 are spaced apart from each other and extend outwardly and generally parallel to the mounting bolt 19 (FIGS. 3 and 4). While the clamp members 15, 20 are being mounted on the bicycle frame, the threaded hand knobs 22 are kept loosely fitted on the bolts 19, 21 until one end of the hose segment 14 can be snuggly slid onto the outwardly extending ears. Once the hose segment 14 is engaged by the ears, the lower end of the mast, like the longitudinal centerline of the hose segment 14, is then disposed about 3 inches below the rear axle of the bicycle 50 (FIG. 1). Prior to tightening the hand knobs 22 further, the user preferably rotates the mast so that its upper end is disposed at about the shoulder height of an animal 40 to be leashed. As the hand knobs 22 are subsequently tightened, clamping the mounting structure to the bicycle frame, the tips of the ears move further apart and become wedged against the inner walls of the hose segment 14.

The reinforced hose segment 14 is sufficiently flexible that it can be bent through an angle of about 180 degrees and, in combination with the mast, allows the animal 40 freedom to move forward and aft from the rear axle of the bicycle 50, as well as perpendicularly thereto. Preferably, the animal 40 can range over an area which extends at least 2 feet forward and aft from the rear axle and up to 3 feet perpendicular to the longitudinal centerline of the bicycle 50. In the preferred embodiment, the reinforced hose segment 14 measures, by way of example, 6 inches in length and has an inner diameter of ¾ inch.

Figure 7:
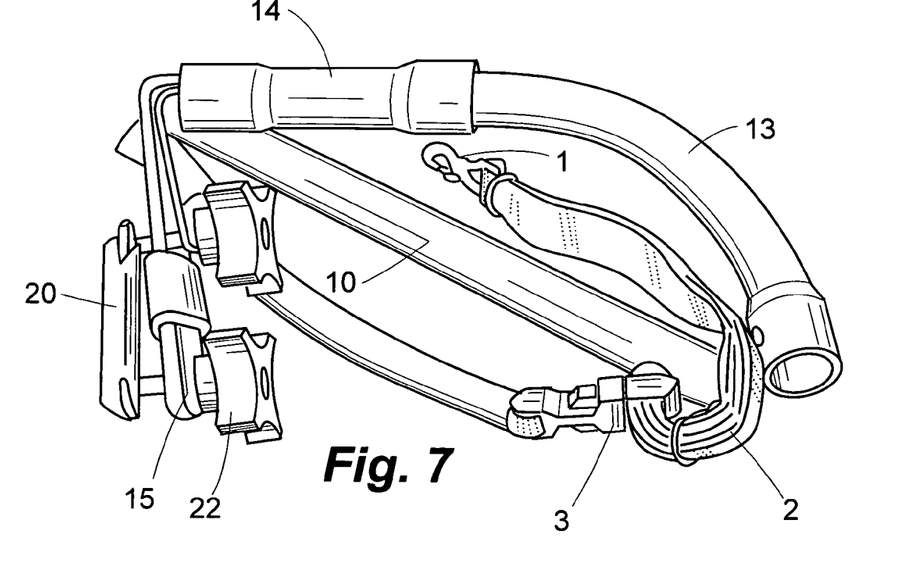
FIG. 7 is a perspective view of the leash according to FIG. 1 in which two sections of the mast, otherwise slip fitted together, are disengaged to facilitate packaging of the leash, the Velcro® fastener and its attachments and an inner cord connecting the two sections not being shown for ease of illustration.

Affixed to the reinforced hose segment 14 distal from the mounting structure, the mast comprises a 90 degree elbow 13, a straight tube section 10, and an upper mast element 7 to which is secured a first flexible strap 5 (FIGS. 2, 4, 5A and 5B). One end of the elbow 13, which, like the section 10 and the element 7, is preferably made of ½ inch plastic pipe, is permanently attached with the use of glue or the like to the hose segment 14. The other end of the elbow 13 terminates in a female connector to which the tube section 10 is slip fitted. The latter can be locked into position relative to the female connector with the use of a spring button 11 (FIG. 4). As illustrated in FIG. 7, this type of temporary locking mechanism allows for compact packaging of the mast components. Alternately, when such compact packaging is not desired, the elbow 13 and the tube section 10 can be glued together or otherwise fabricated as a single unitary piece.

Figure 5A:
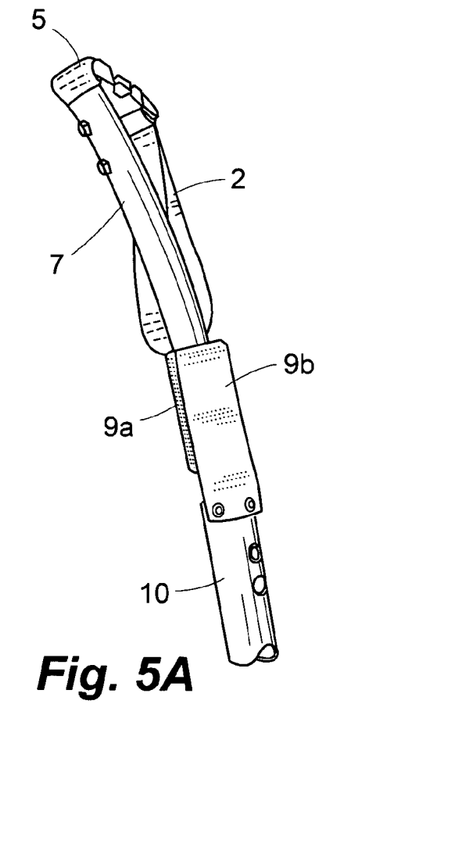
FIGS. 5A and 5B are perspective views, on an enlarged scale, of fragmentary portions of the leash according to FIG. 1, a safety release including a safety button and Velcro R fastener disposed between two sections of a mast in the leash being shown when the release is engaged and disengaged, respectively.
Figure 5B:
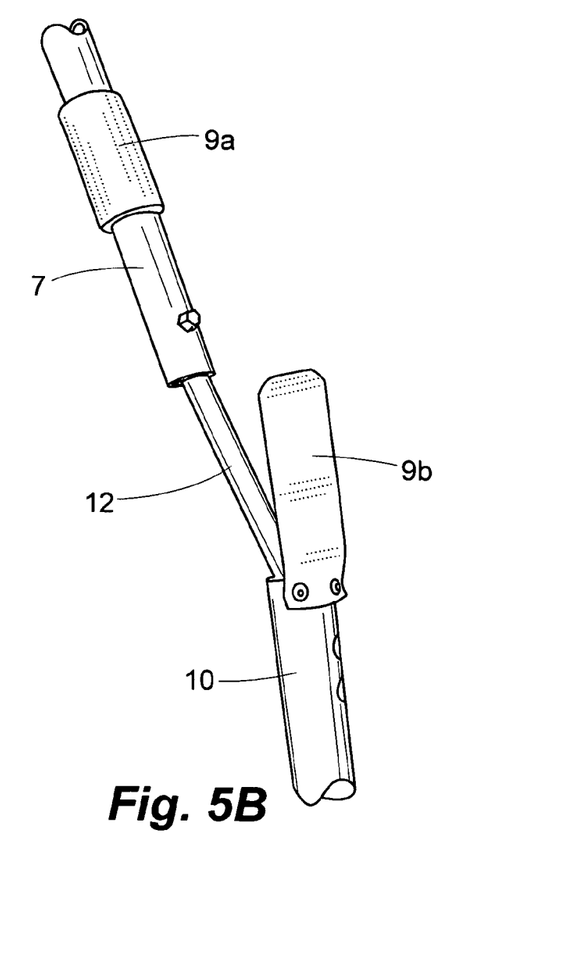
Figure 6:
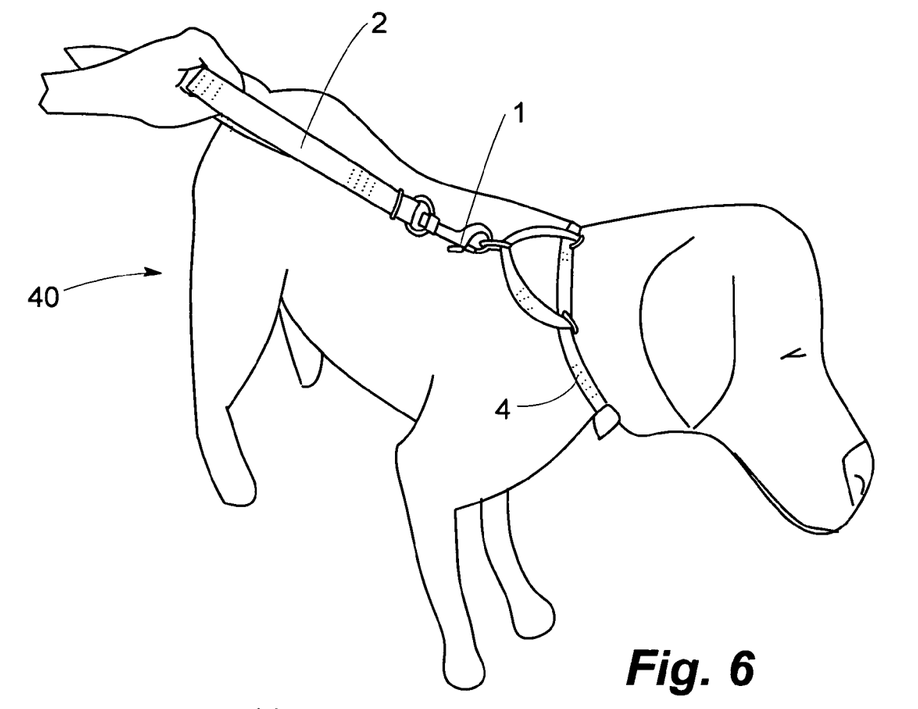
FIG. 6 is a perspective view of a flexible strap which, in the assembled leash according to FIG. 1, is disposed at the end thereof distal from the mounting structure, the strap being shown separately while in use to hold a dog in check.

The juncture between the straight tube section 10 and the upper mast element 7 is formed when one end of the latter is slip fitted into the tube section. The user then has the option of engaging a spring clip 8 in such a way as to lock the upper mast element 7 and the tube section 10 together (FIG. 4). However, if it is desired that the upper mast element 7 and the tube section 10 be separated under a sharp pull on the strap 5, then the spring clip 8 is not engaged; rather they are held together by their snug fit and optionally by Velcro® fastener elements 9a and 9b (FIGS. 4, 5A, 5B). The fastener produces a loud ripping sound when the elements 9a and 9b are pulled apart, giving the bicycle rider an audible warning. To insure that an animal 40 is restrained even when the upper mast element 7 is separated from the tube section 10, distal ends of a secondary elastic cord 12 are affixed to the inner walls of the element 7 and to either the section 10 or 13, respectively (FIGS. 4 and 5B).

The flexible strap 5 is secured with the use of fasteners 6 to the end of the upper mast element 7 distal from the tube section 10 (FIGS. 2, 4, and 5A). Connected to the strap 5 by a latch 3 having detachable mating components which are engaged by snap action or the like is a second flexible strap 2 (FIG. 1, 2, 4 and 5A). The strap 2 terminates in a clip 1 which can be attached to a standard dog collar 4 or harness. In the preferred embodiment, the overall length of the assembled leash 30 from the mounting structure to the clip 1 is roughly 2 feet.

For ease of packaging as shown in FIG. 7, the tube section 10 can be disconnected from the elbow 13; and the upper mast element 7 disconnected from section 10. However, if packing size is not critical, elbow 13 and the tube section 10 may be glued together or fabricated as a single, unitary piece as embodied in leash 60 (FIG. 8).

Figure 8:
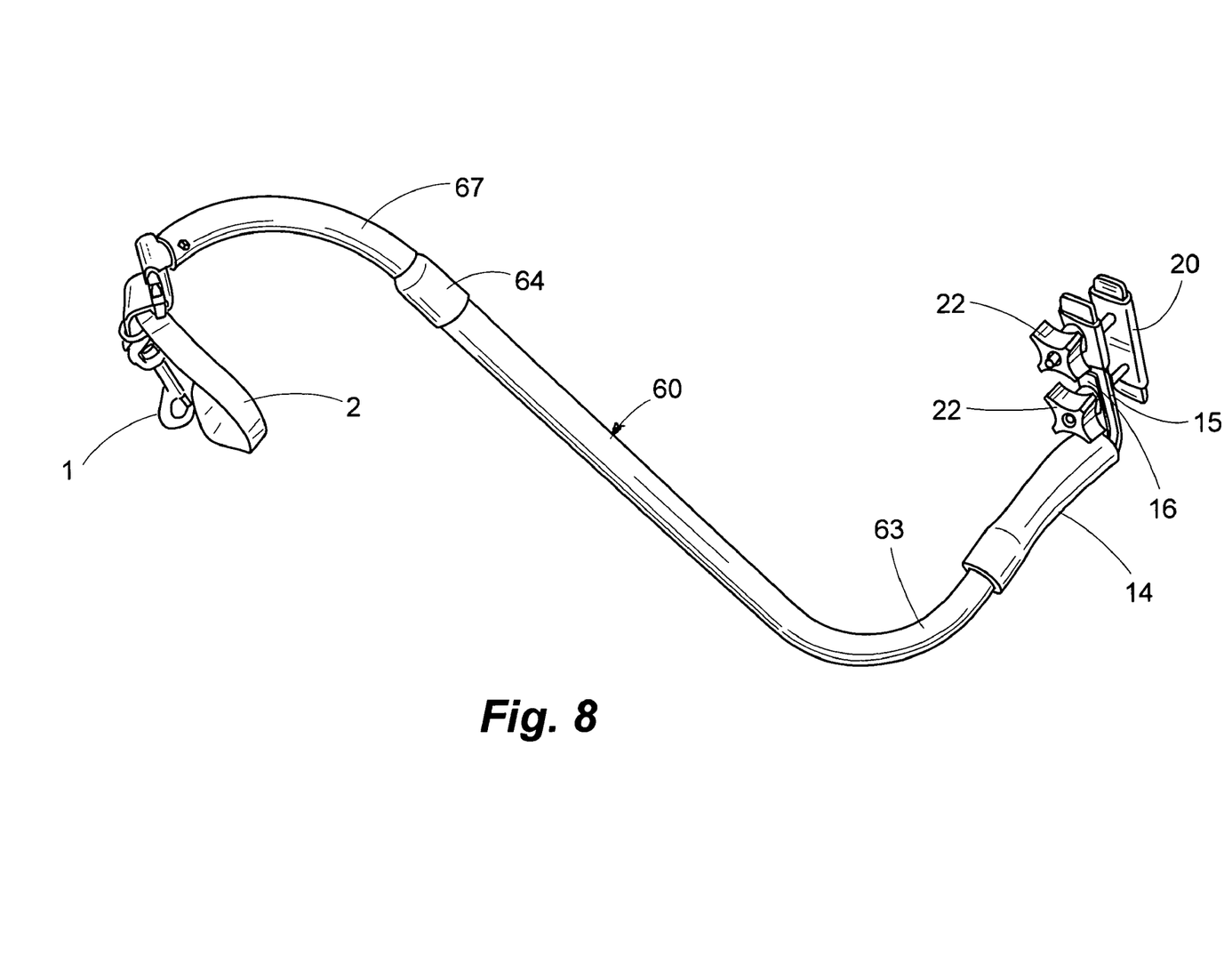

The leash 60, shown in FIG. 8, which is a simplified version of the present invention, comprises an upper mast element 67, a fitting 64, and a lower mast section 63 which combines an elbow and a straight section. The lower end of the mast section 63 is permanently attached to the reinforced hose segment 14; and the latter, as in the case of the leash 30, is wedged onto the ears of the outer clamp member 15 and the formed angle member 16 when the nuts 22 are tightened, clamping the mounting structure on the bicycle 50. Bent along an arc which subtends an angle of up to 90 degrees, the upper mast element 67 is affixed to the fitting 64; and the latter is likewise permanently attached to the upper end of the lower mast element 63. So attached, the mast elements 63 and 67 and the fitting 64 are aligned in such a way that they define a combination which, in general, has the shape of an elongated "S". In this alternate embodiment, which lacks the secondary elastic cord 12 and related break-away features of the leash 30, the mast 60 can be fabricated of either a hollow or solid material. Suitable for use with a well trained animal 40, the mast 60 is substantially less costly to manufacture than the leash 30.

For use with the leash 30, 60 preferred animal commands—prefixed in each instance by the animal's name—include:

"Move"—to make the animal go.

"Wait"—to have the animal stop and wait for the next move command.

"Left"—to warn the animal you are making a left. (Repeat for left U-turns)

"Right"—to warn the animal you are making a right. (Repeat for right U-turns.)

"Heel"—to encourage the animal to run closer to you. (Use if animal is too far to the side of the bicycle with an obstacle ahead.)

"Watch me or leave if"—to keep animal from being distracted. (Use when other animals are present or obstacles are close.)

All animals tested to date were found to adapt quickly to the leash according to the present invention; and its use was enjoyable both for the animals and the bike riders.

The invention claimed is:

1. An apparatus for holding an animal in check, while the animal is tethered to a bicycle, the bicycle having a rear wheel axle and a rear wheel support structure, defining an approximately 90 degree elbow which comprises:
   (a) a mast;
   (b) a clamp removably attaches to the rear wheel support structure; and
   (c) a flexible coupling which connects the mast to the clamp, the flexible coupling being disposed downwardly of the rear wheel axle, the mast, in use, extending outwardly and upwardly from the flexible coupling, the flexible coupling being stiff enough to control the animal yet sufficiently flexible to protect the animal from sudden jerks on the mast; and
   (d) means, including the 90 degree elbow, for adjusting the height of the end of the mast distal from the flexible coupling, the mast including an upper mast element which is situated between said distal end and the 90 degree elbow, the upper mast element curving outwardly relative to the 90 degree elbow in such a way that the mast arches away from the flexible coupling—has been inserted after "the mast".

2. The apparatus according to claim 1, in which the flexible coupling comprises an elongated reinforced hose segment which is sufficiently flexible to allow the end of the mast distal from this hose segment to move across an area which extends substantially the length of the bicycle.

3. The apparatus according to claim 1, wherein the mast comprises two hollow elongated sections which, in use, are slipped together and which further comprises a cord whose distal ends are affixed to the inside walls of the elongated sections, the cord connecting the elongated sections and extending therebetween whenever a sudden jerk applied to the mast either by the animal or the bicycle causes the elongated sections to separate.

4. An apparatus for holding an animal in check, while the animal is tethered to a bicycle, the bicycle frame supporting a rear wheel axle, which comprises:
   (a) a mast which, in use, extends outwardly and upwardly from points proximate with and downwardly of the rear wheel axle;
   (b) a clamp removably attachable to the bicycle frame near the rear wheel axle; and
   (c) means, including a flexible coupling, for connecting the mast to the clamp, the flexible coupling defining a generally cylindrical inside wall; the means connecting the mast to the clamp including two angle members and at least one threaded locking means for holding the angle members in assembled relation, each angle member having a protruding ear which is disposed, in use, generally parallel with and downwardly of the rear wheel axle, the ears of the two angle members being slip fitted into the flexible coupling, the ears diverging and pressing against the inside wall when the threaded locking means is tightened, locking one end of the flexible coupling in position below the rear wheel axle.

5. An apparatus for holding an animal in check, while the animal is tethered to a bicycle, the bicycle having a rear wheel support structure, which comprises:
   (a) a mast;
   (b) a clamp removably attachable to the rear wheel support structure;
   (c) means, including a flexible coupling, for connecting the mast to the clamp, the flexible coupling being stiff enough to control the animal yet sufficiently flexible to protect the animal from sudden jerks on the mast, the mast having two hollow elongated sections having in use, are slip fitted together; and
   (d) a fastener which a pair of hook and loop-type lockable elements, one lockable element being attached to each of the elongated sections, the lockable elements, during use, being engaged but separating when sufficient stress is applied to the fastener to shear apart the lockable elements.

6. An apparatus for holding an animal in check, while the animal is tethered to a bicycle, the bicycle having a frame, which comprises:
   (a) a mast;
   (b) a clamp including inner and outer clamp members and at least one threaded locking means, the threaded locking means retaining the inner and outer clamp members in assembled relation, the clamp being attachable to the bicycle frame; and
   (c) means, including a flexible coupling, for connecting the mast to the clamp, the flexible coupling defining a generally cylindrical inside wall; the means connecting the mast to the clamp including at least one angle member, the threaded locking means holding the angle member in assembled relation with the outer clamp member, the angle member and the outer clamp member each having a protruding ear the ears of the angle member and the outer clamp member being aligned generally in parallel and being slip fitted into the flexible coupling, the ears diverging and pressing against the inside wall when the threaded locking means is tightened, locking one end of the flexible coupling in position.

7. An apparatus for tethering an animal to a bicycle while allowing the animal a wide range of movement, the bicycle frame supporting a rear wheel axle, which comprises:

(a) clamp means attachable to the bicycle frame near the rear wheel axle, the clamp means defining at least one protruding ear which is disposed downwardly of the rear wheel axle and which extends outwardly and generally parallel to its rotational axis;

(b) a mast which, in use, is secured to the animal; and (c) a flexible coupling connecting the mast to the ear, the mast being movable, in the forward and aft directions, through an arc of at most 180 degrees about the ear, so that forces exerted, through the mast, on the bicycle frame tend to tip the bicycle away from the animal as the animal pulls sideways on the mast.

* * * * *